United States Patent [19]

Knox

[11] Patent Number: 5,549,275
[45] Date of Patent: Aug. 27, 1996

[54] VALVE WITH ADJUSTABLY PRESSURIZED SEALING GASKETS

[76] Inventor: Granville S. Knox, 1323 Santa Margarita, Fallbrook, Calif. 92028

[21] Appl. No.: 522,142

[22] Filed: Aug. 31, 1995

[51] Int. Cl.$^6$ .................................................. F16K 5/20
[52] U.S. Cl. .......................... 251/170; 251/188; 137/241
[58] Field of Search .................................. 251/157, 159, 251/161, 170, 188; 137/241

[56] References Cited

U.S. PATENT DOCUMENTS 2,863,629  12/1958  Knox .
3,064,938  11/1962  Knox .

*Primary Examiner*—John C. Fox
*Attorney, Agent, or Firm*—William W. Haefliger

[57] ABSTRACT

A valve mechanism for installation in a pipe line for controlling the movement of a flowable material therein which comprises a central body section with end sections connected thereto and forming therewith a valve stopper chamber, the end sections each having an associated annular projection extending into the valve stopper chamber with fluid-flow passages extending outwardly therefrom; a valve stopper in the chamber having a flow passage extending therethrough and sealing surfaces bounding the flow passage; a structure for moving the stopper to a valve open position substantially aligning the stopper flow passage with the end section flow passages, and to a valve closed position blocking the end section flow passages; and a gasket encircling each end section projection and thrust structure operable to press the gaskets against the stopper sealing surfaces when the stopper is in valve open and valve closed positions.

9 Claims, 5 Drawing Sheets

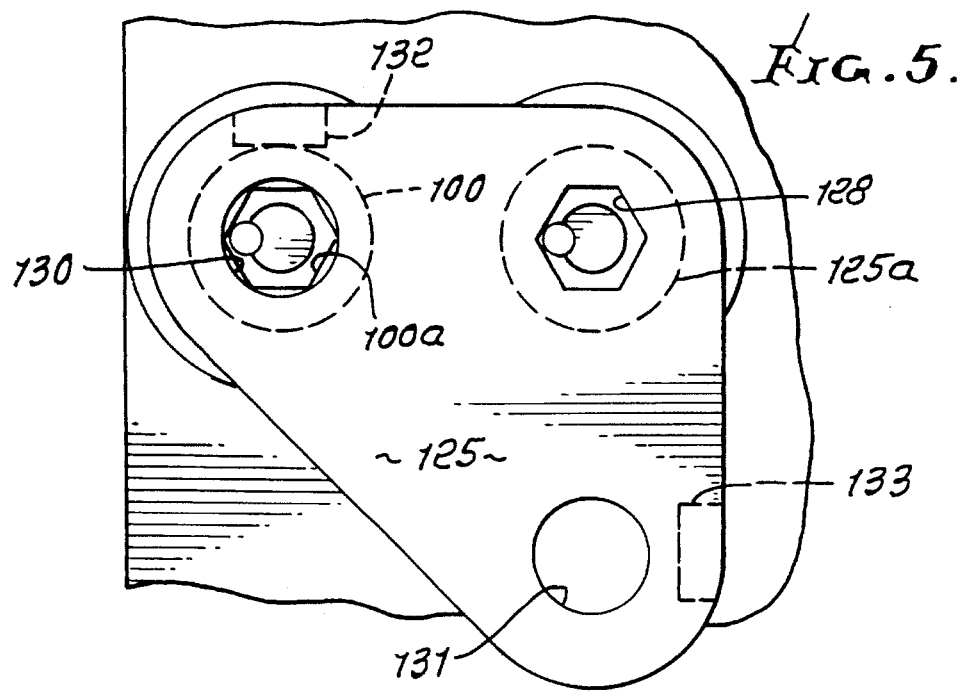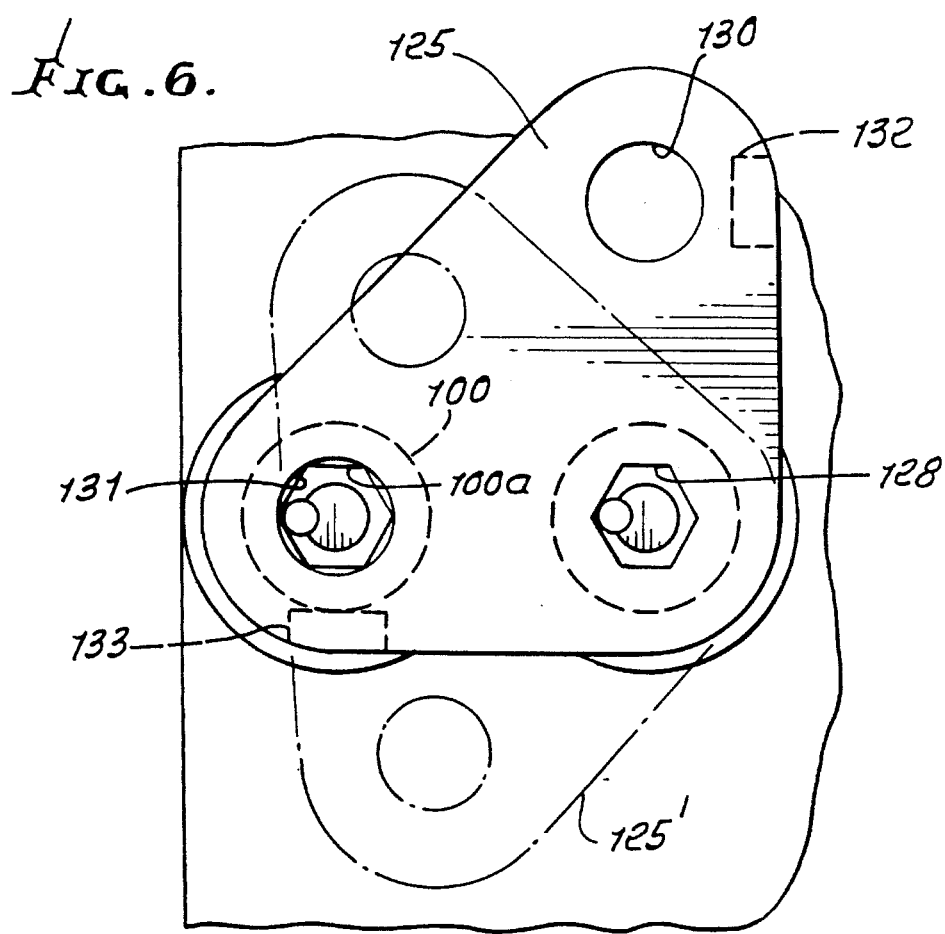

5,549,275

VALVE WITH ADJUSTABLY PRESSURIZED SEALING GASKETS

BACKGROUND OF THE INVENTION

This invention relates generally to gasket sealed valves of ball type; and more particularly concerns pressurization of such gaskets.

There is need for provision of a valve for pipe line use wherein the working parts of the valve can be maintained in a closed and sealed valve stopper chamber, out of communication with the flowable material in the pipe line, when the valve stopper is in its valve open and valve closed positions.

This feature is very important for standby or safety shut-off valves where the valve stopper normally remains in one position for long periods of time. Often, the position of the valve stopper of such valves is changed only when there is some unusual pipe line emergency.

Pipe lines often carry flowable materials containing varying amounts of very small, solid particles. The solid particles have a tendency to "settle out" in the quiet flow zones of valve stopper chambers that are not completely closed and sealed. Over time, an accumulation of solid particles in the valve stopper chamber may seriously interfere with the working parts of the valve.

There is also a need to provide means for equalizing the thrusting force applied to each sealing gasket during and after the sealing operation has taken place, in order that variations in fluid pressure acting against the valve stopper will not change the effectiveness of the sealing gaskets.

Assume, for instance, that after the valve stopper has been moved to the "valve closed" position, there is an increase in fluid pressure on one side of the valve stopper and little or no fluid pressure on the other side of the stopper. Because of trunnion bearing clearances, the stopper tends to move towards the low pressure side, and would normally tend to decrease the thrusting force being exerted against the gasket on the high pressure side. There is need for means operable to assure that the thrusting force exerted against each gasket remains substantially the same.

SUMMARY OF THE INVENTION

It is a major object of the invention to provide means meeting the above needs. Basically, the improved valve mechanism of the invention is installable in a pipe line, for controlling movement of a flowable material, and comprises:

a) a central body section with end sections connected thereto and forming therewith a valve stopper chamber, the end sections each having an associated annular projection extending into the valve stopper chamber with fluid-flow passages extending outwardly therefrom, b) a valve stopper in the chamber having a flow passage extending therethrough and sealing surfaces bounding the flow passage, c) means for moving the stopper to a valve open position substantially aligning the stopper flow passage with the end section flow passages, and to a valve closed position blocking the end section flow passages, d) a gasket encircling each end section projection, and thrust means operable to press the gaskets against the stopper sealing surfaces when the stopper is in valve open and valve closed positions.

As will be seen, the thrust means may advantageously comprise thrustors extending at least part way about the end sections, to be displaced for pressurizing the gaskets.

Another object includes the provision of actuator means that includes structure to simultaneously displace the thrustors relative to the end sections. Such actuator means may advantageously comprise an actuator bar extending between the thrustors to apply displacing force thereto, and in response to bar displacement relative to the end extents, an actuator member adjustably movable to displace the bar, and to hold the bar in displaced position, thereby to maintain force application to the bar. The actuator member is preferably positioned to transmit displacing force to the bar intermediate the thrustors, thereby to substantially equalize force transmission to the thrusters by the bar. Also, the bar and thrustors are preferably protectively enclosed within the valve stopper chamber, as will be seen.

Yet another object is to provide actuator means that includes a threaded part with which the member has threaded interfit, whereby rotation of the part effects advancement of the member to displace the bar. The actuator member typically interfits the bar at a location characterized in that the bar is displaced to effect substantially equalized force transmission to the thrustors.

A further object includes the provision of thrustors in the form of two rings rotatable about the end extents and axially movable relative thereto. Camming means is typically provided for effecting axial movement of the rings in response to ring rotation about the end extents, the actuator means operable to effect ring rotation about the end extents. Such camming means may advantageously include multiple sets of conical surfaces on the rings and on the end sections, the surfaces facing one another, and balls located between and engaging the conical surfaces.

A yet further object includes the provision of blocking means to block pressurization of the gaskets at times when the stopper is not in a valve open or valve closed position. Such blocking means may block access to the actuator means during movement of the stopper between valve open and valve closed positions, while allowing access to the actuator means when the stopper is in its valve open and valve closed positions. For this purpose, a plate may be provided to be movable in conjunction with movement of the means for moving the stopper, the plate having two holes, one of which is in registration with the actuator means in valve open position of the stopper, and the other of which is in registration with the actuator means in valve closed position of the stopper.

Another object of the invention is to provide means for "jet cleaning" or "steam cleaning" working parts of the valve, while it remains in service on the pipe line. This is made possible by providing one or more normally closed openings, extending through the central body wall into the closed valve stopper chamber. This is a very desirable feature for valves installed in pipe lines handling cement slurries, and also on pipe lines handling tar-like fluids.

These and other objects and advantages of the invention, as well as the details of an illustrative embodiment, will be more fully understood from the following specification and drawings, in which:

DRAWING DESCRIPTION

FIG. 5 is a top plan view showing blocking means to block access to the actuating mechanism when the valve is being moved between open and closed positions;

FIG. 6 is a view like FIG. 5 showing the blocking means in an alternate position;

DETAILED DESCRIPTION

Figure 1:
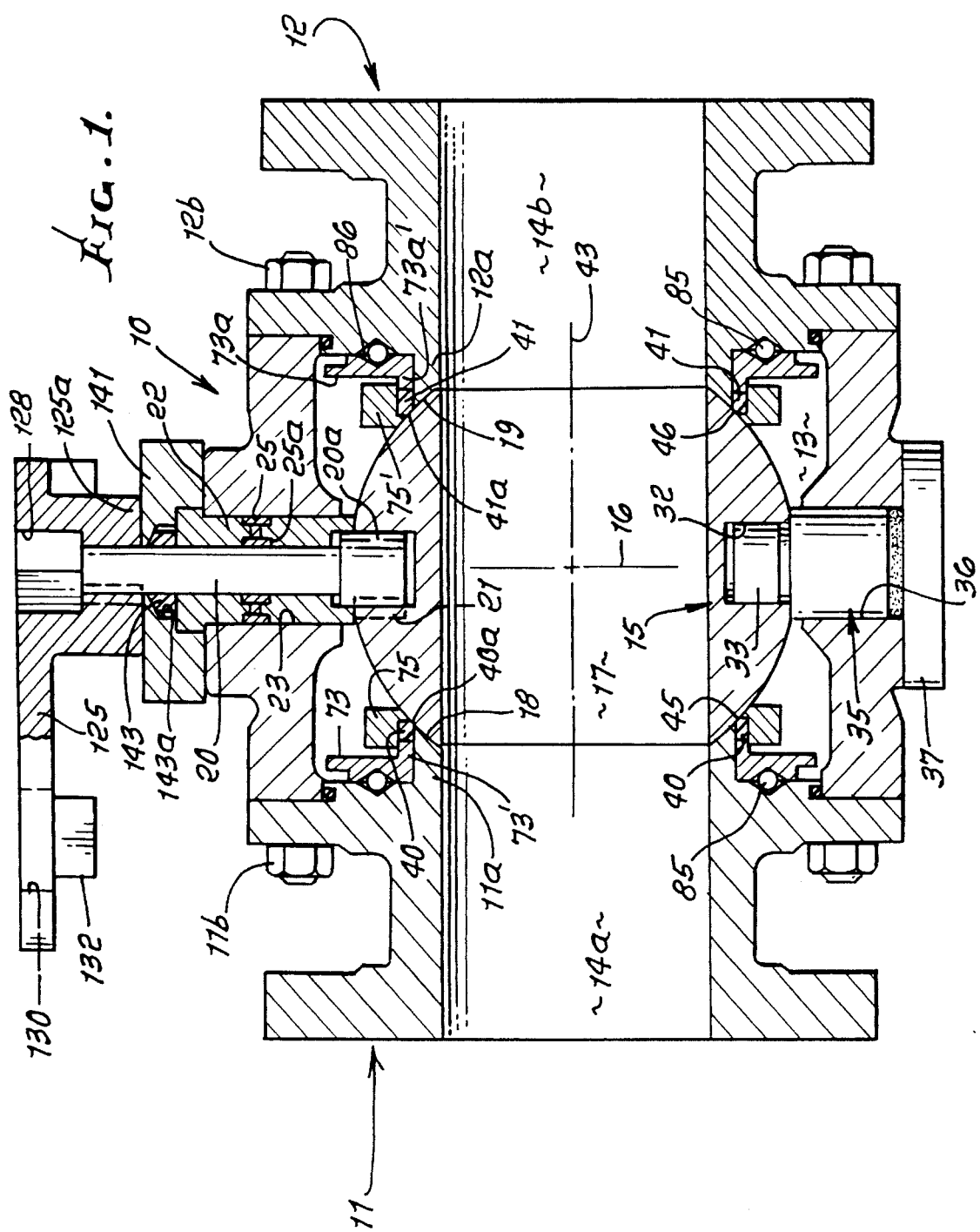
FIG. 1 is a vertical section taken through a preferred form of the valve.

In FIGS. 1–4, the valve includes a flanged body 10 and flanged end sections, or caps, 11 and 12 connected to the body by stud bolts 11b and 12b. A valve chamber 13 is thereby formed, to have coaxial flow inlet and outlet ports, as for example at 14a and 14b. See axis 43. Flow may pass either way through the valve. A valve stopper 15 in the general form of a spherical plug is located in the chamber 13 for rotation therein about an axis 16, which may extend vertically, as shown. Such rotation through ninety degrees carries a horizontal passage 17 through the stopper into and out of registration with the horizontal ports 14a and 14b, for controlling fluid flow through the valve.

In general, there is a slight clearance between the stopper surface and the spherical, concave surfaces 18 and 19 of the end sections 11a and 12a, so that the stopper may be readily turned within the chamber by rotation of the vertical spindle 20, to the lower, enlarged end 20a of which the stopper is keyed at 21. The spindle is centered with respect to axis 16 by a bushing 22 received within a vertical bore 23 in body 10, the bushing containing a pair of annular recesses 25 and 25a sealed with plastic packing injected under pressure to seal off between the bushing and the spindle, and also between the bushing and bore 23.

At the opposite, solid side of the stopper, a recess 32 is sunk therein to receive a bearing assembly 33, which may include a race and needle bearings (not shown) to enable stopper rotation about the axis 16 of fixed trunnion 35. The latter is received within a bore 36 in body 10. Cap 37 extends over the end of trunnion 35.

The two end sections or caps 11 and 12 are shown to include coaxial annular projections 11a and 12a that extend into the chamber 13, as shown. The end sections and projections form fluid flow passages, such as ports 14a and 14b referred to above.

Two gaskets 40 and 41 encircle the respective two annular projections 11a and 12a, in positions to receive thrust exerted in the direction of axis 43, to press against the stopper sealing surfaces indicated at 45 and 46 as extending annularly about axis 43, when the stopper is in valve open and also in valve closed positions. Note that the gaskets have angled stopper engagement surfaces 40a and 41a. See also FIGS. 7 and 8.

Thrust means, including thrustors, are provided, as at 73 and 73a, to extend at least part way about the projections 11a and 12a, and to be displaced for pressurizing the two gaskets. The thrustors may take the form of annuli, as shown, having annular lips 73' and 73a' projecting toward the gaskets.

The sealing gaskets may comprise a material known as Teflon, which is the trade name for polymerized tetrafluoroethylene; or if temperature conditions are extremely high, a preformed packing annulus of asbestos material may be used. The sealing gaskets are required to seal off only when compressed by thrust members 73 and 73a, and therefore do not necessarily need to be precision molded into a close-fitting ring, and the material need not be resilient.

Figure 7:
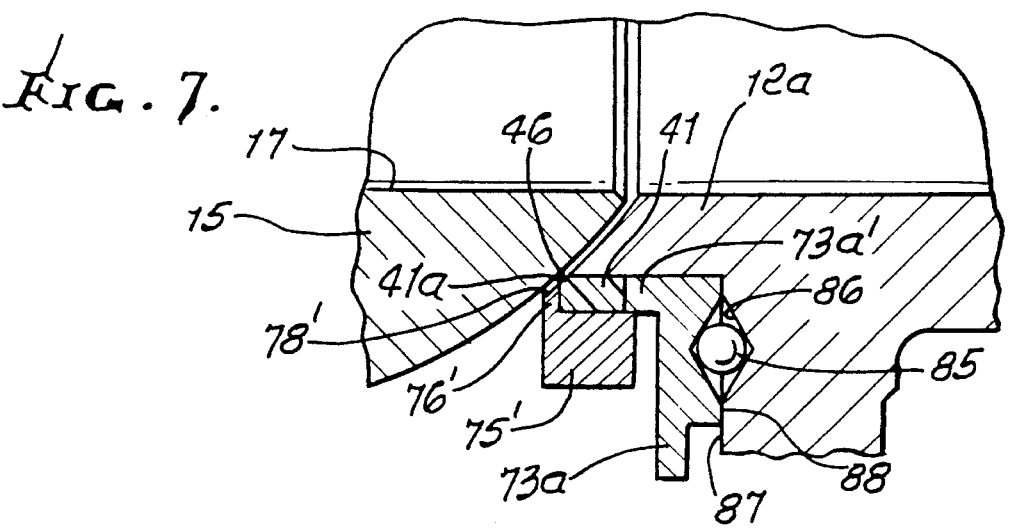
FIGS. 7 and 8 are views showing stages in operation of thrust mechanism.
Figure 8:
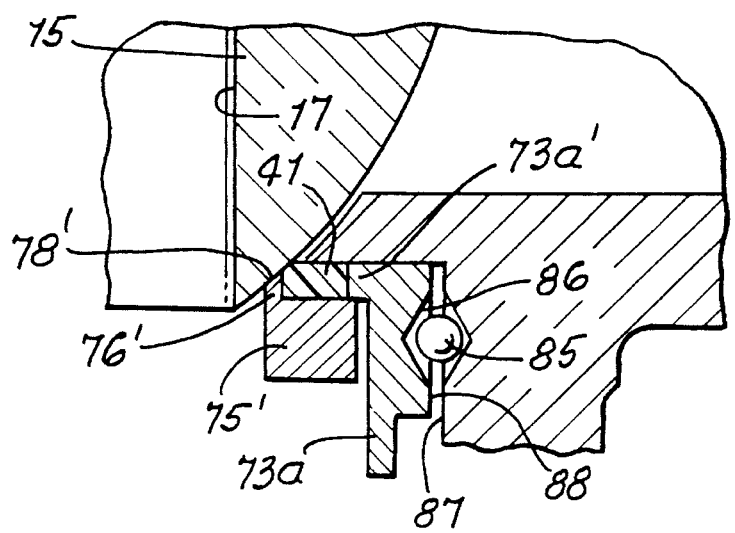

Spaced radially outwardly from the projection 12a is a metallic ring 75', which is mounted on the lip 73a', and projects at 76' between a shoulder portion of the packing and stopper 15, the ring 75' having a terminal annular surface 78', which may be spherically concave to fit the stopper surface, as seen in FIG. 8, when the packing or gasket 41 is pressurized. The surface 78' may be spaced slightly from the stopper surface, as in FIG. 7, to allow stopper rotation without interference, when the packing 41 is not pressurized. Corresponding elements are provided, as respects ring 75 and gasket or packing 40.

When the thrust members 73 and 73a are simultaneously rotated about the projection 11a and 12a, and displaced bodily toward the gaskets 40 and 41, they transmit thrust acting to press the gaskets against the stopper 15, the projections 11a and 12a, and the ring portions 76 and 76', whereby seals are effected. Such bodily displacement of the gaskets into pressural engagement with the stopper 15 serves to carry the rings 75 and 75', and ring portions 76 and 76' bodily with the gaskets into engagement with the stopper surface, thereby eliminating the clearances between ring surfaces 78 and 78' and the stopper surface The thrust members 73 and 73a are simultaneously rotated about the projections 11a and 12a, and displaced axially toward one another, as described above, by actuating cam mechanism. This rotary movement of each thrust ring is accompanied by axially bodily displacement thereof along axis 43, as a result of the camming action of a plurality of balls 85 carried in opposite conical recesses 86 circularly spaced about axis 43. As seen in FIGS. 7 and 8, recesses 86 are formed in opposite faces 87 and 88 of the body cap 12, and thrust member 73a, respectively.

Prior to rotation of the thrust ring member 73a, the balls are centered in the recesses 86, so that the thrust ring 73a is in an axial position close to the face 87 on the body cap 12. However, as the thrust ring member 73a is rotated, the balls 85, which are in the path of thrust member rotation, and which engage the walls of the recesses 86 angled in the direction of thrust ring rotation and axial advancement toward the gasket annulus, roll up the inclined recess walls substantially without friction to displace the thrust member 73a axially toward the packing annulus 41, as seen in FIG. 8. Similar structure is provided in association with thrustor 73.

Figure 3:
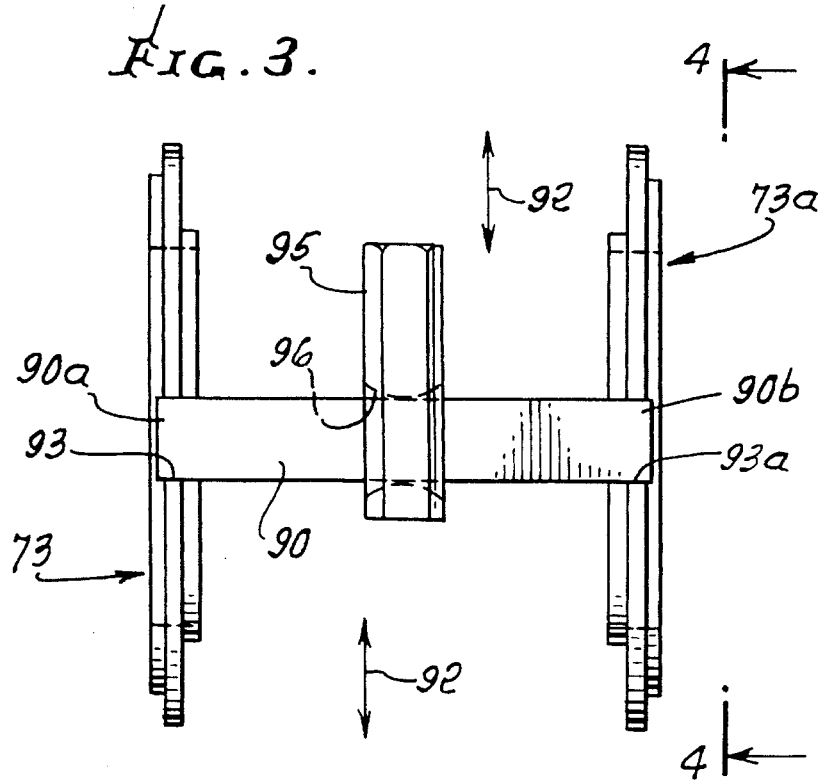
FIG. 3 is a top plan view of valve actuating mechanism.
Figure 4A:
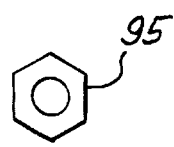
FIG. 4a is a view taken on lines 4a—4a of FIG. 4.
Figure 4:
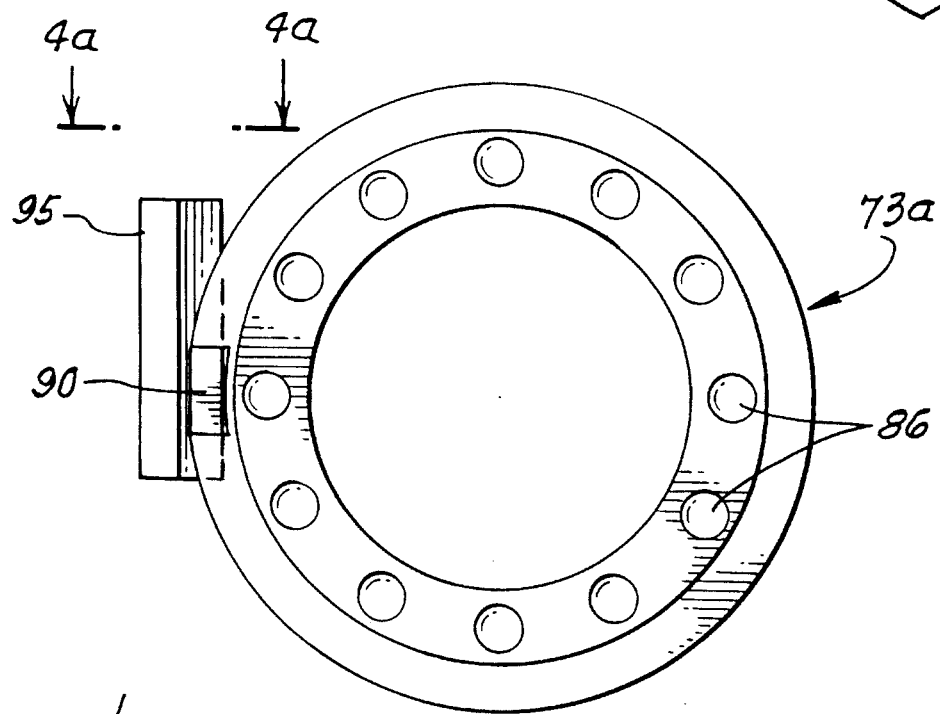
FIG. 4 is an elevational view taken on lines 4 of FIG. 3.

The actuator means includes structure to simultaneously rotate the two thrustors 73 and 73a, as described, and relative to the end sections and projections 11a and 11b. Such actuator means includes an actuator bar 90 extending between the thrustors 73 and 73a, as better seen in FIGS. 3 and 4, to apply displacing force thereto in directions indicated by arrows 92, normal to the laterally elongated extent of the bar. The slots 93 and 93a in the thrustors interfit with the respective opposite ends 90a and 90b of the bar. An actuator member 95 is adjustably endwise movable in the direction of arrows 92, to displace the bar. Note that the member 95 is positioned to transmit displacing force to the bar intermediate the two thrustors, thereby to substantially equalize force transmission to the two thrustors by the bar 90. As seen in FIG. 3, the member 95 forms a slot 96 within which a mid portion of the bar interfits walls 96a of the slot so that maximum pressure is applied at the center of the bar. The bar and thrustors are protectively contained within the chamber 13 and exposed thereto.

Figure 9:
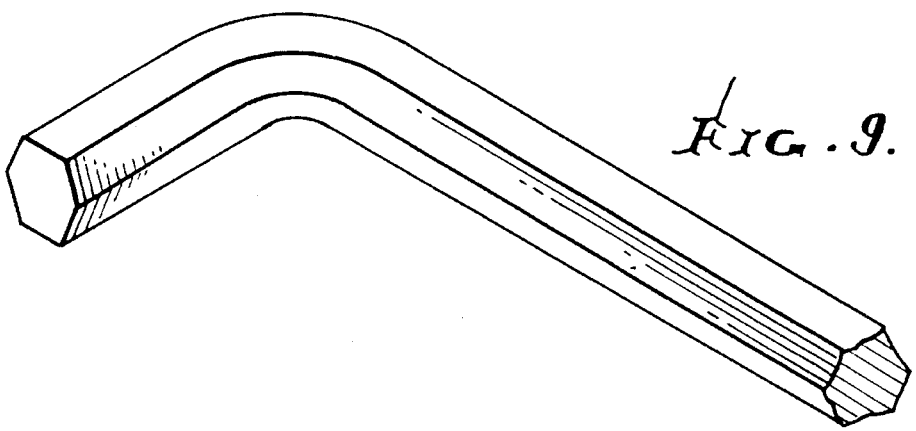
FIG. 9 is a perspective view of a tool to rotate valve actuating mechanisms.

The actuator means may also include a threaded part 97 with which actuator member 95 has threaded interfit at 98, whereby rotation of part 97 about axis 99 effects controlled displacement of the member 95 to controllably displace the bar to displace the thrustors. Elongated part 97 is integral with a stem 97a to which an external control knob or hex head 100 is keyed, whereby an external hex wrench head 115 may be fitted into the internal hex 100a formed by head 100 to rotate part 97. See also FIG. 9. A bushing 101 guidably receives the stem 97a, and seals are provided at 102 and 103. Passages 107 and 108 are provided for fluid displacement.

See also retention cap 140 and 141 suitably attached to body 10, and annular Teflon seals 142 and 143 are received in recesses 142a and 143a formed by the caps. A Teflon thrust bearing is provided at 144. Normally closed openings are provided at 145 and 146 in the wall of body 10.

Under some severe operating conditions, the normally closed openings in the central body wall 10 may be connected to a steam source, to clean collected particulate from surfaces exposed to interior chamber 13.

Referring to FIGS. 5 and 6, they illustrate one form of blocking means to block pressurization of the gaskets at times when the stopper is not in the valve open or valve closed position. The blocking means shown blocks access to the actuator means, as at internal hex 100a during movement of the stopper between valve open and valve closed positions, while allowing access to the actuator means when the stopper is in each of its open (FIG. 5) and closed (FIG. 6) positions.

Figure 2:
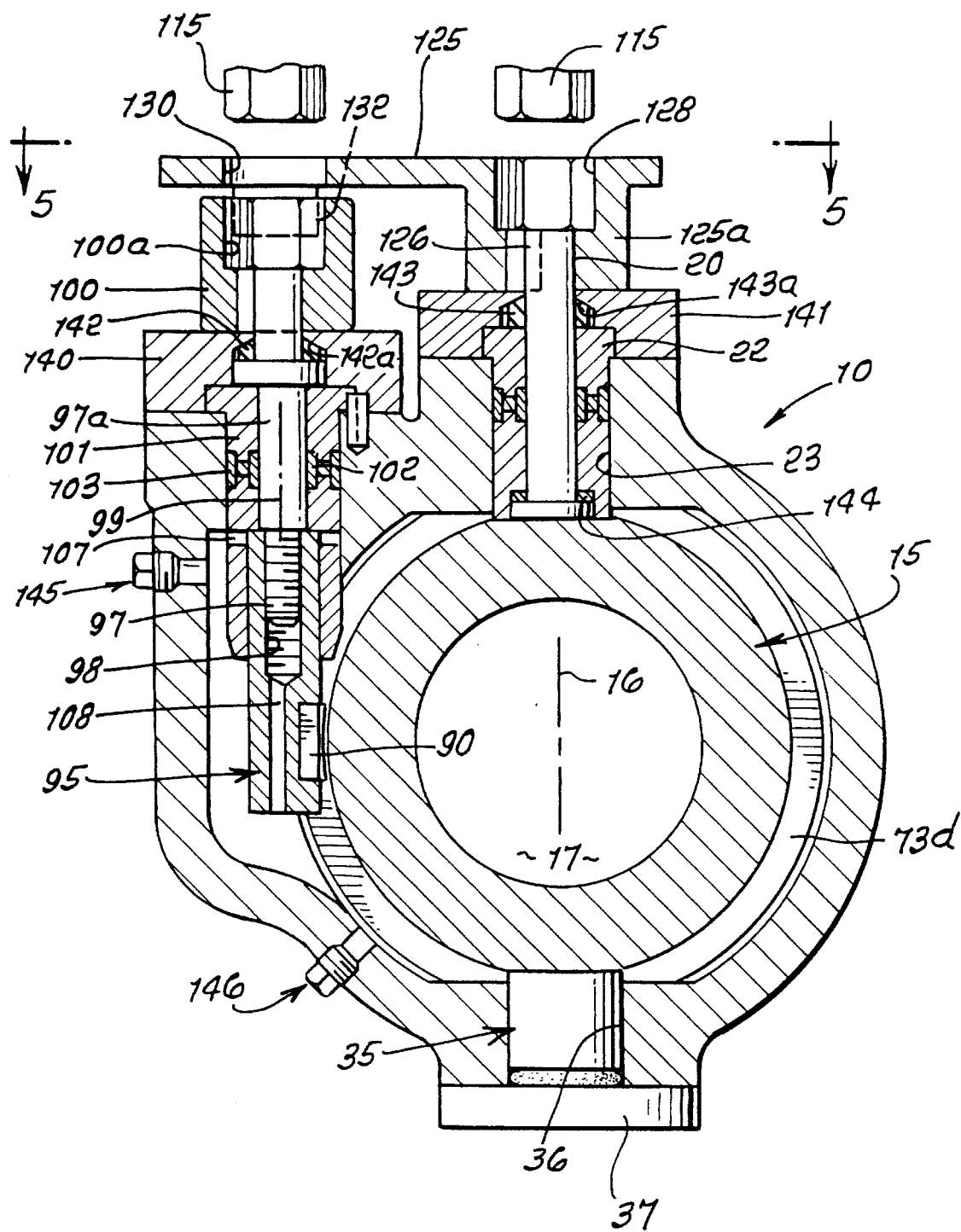
FIG. 2 is a vertical section taken through the FIG. 1 valve and taken at right angles thereto.

Such blocking means may advantageously take the form of a plate 125 movable in conjunction with movement of the means for moving the stopper, i.e., as shown in FIG. 2; plate 125 has a boss 125a keyed at 126 with stopper spindle 20, whereby the plate rotates about axis 16 when the external hex head wrench 115 is inserted into internal hex 128, and rotated. See plate intermediate position 125' in FIG. 6, for example. The plate blocks hex openings 100a, hex 128 opening always remains open, as the plate rotates between FIG. 5 and FIG. 6 positions. The plate has two holes or through openings 130 and 131, one of which (130) is in registration with the actuator means hex 100a in valve open position (FIG. 5), and the other (131) of which is in registration with the hex 100a in valve closed position (FIG. 6). See also the stops 132 and 133 alternately engageable with head 100, as shown, to limit plate rotation at the registration positions described.

I claim:

1. A valve mechanism for installation in a pipe line for controlling the movement of a flowable material therein, the said mechanism comprising:

a) a central body section with end sections connected thereto and forming therewith a valve stopper chamber, said end sections each having an associated annular extension projecting into said valve stopper chamber with fluid-flow passages extending outwardly therefrom, b) a valve stopper in said chamber having a flow passage extending therethrough and sealing surfaces bounding the flow passage, c) means for moving said stopper to a valve open position substantially aligning the stopper flow passage with the extension flow passages, and to a valve closed position blocking said flow passages, d) and a gasket encircling each end section extension and thrust means operable to press said gaskets against the stopper sealing surfaces when the stopper is in valve open and valve closed positions, e) said thrust means including thrustors extending at least part way about said end sections, to be displaced for pressurizing said gaskets, and actuator means movable to displace said thrustors, f) and wherein said actuator means includes an actuator bar extending between said thrustors to apply displacing force thereto, in response to bar displacement relative to said end sections, and an actuator member adjustably movable to displace said bar, and to hold the bar in displaced position thereby to maintain force application to said thrustors via the bar.

2. The mechanism of claim 1 wherein said actuator member is positioned to transmit displacing force to the bar intermediate said thrustors, thereby to substantially equalize force transmission to the thrustors by the bar.

3. The mechanism of claim 1 wherein said bar and said thrustors are within the interior of said valve stopper chamber.

4. The mechanism of claim 1 wherein said actuator means includes a threaded part with which said member has threaded interfit, whereby rotation of said part effects displacement of said member to displace the bar.

5. The mechanism of claim 4 wherein said member interfits the bar at a location characterized in that the bar is displaced to effect substantially equalized force transmission to said thrustors.

6. A valve mechanism for installation in a pipe line for controlling the movement of a flowable material therein, the said mechanism comprising:

a) a central body section with end sections connected thereto and forming therewith a valve stopper chamber, said end sections each having an associated annular extension projecting into said valve stopper chamber with fluid-flow passages extending outwardly therefrom, b) a valve stopper in said chamber having a flow passage extending therethrough and sealing surfaces bounding the flow passage, c) means for moving said stopper to a valve open position substantially aligning the stopper flow passage with the extension flow passages, and to a valve closed position blocking said flow passages, d) and a gasket encircling each end section extension and thrust means operable to press said gaskets against the stopper sealing surfaces when the stopper is in valve open and valve closed positions, e) said thrust means including thrustors extending at least part way about said end sections, to be displaced for pressurizing said gaskets, and actuator means movable to displace said thrusters, f) said annular end extensions defining an axis, and said thrustors comprising annular rings, which are rotatable about said extensions and axially movable relative thereto, g) and including camming means for effecting axial movement of the rings in response to ring rotation about said end sections, said actuator means operable to effect ring rotation about said end extensions.

7. The mechanism of claim 6 wherein said camming means includes multiple sets of conical surfaces on the rings and on the end sections, said surfaces facing one another, and balls located between and engaging said conical surfaces.

8. A valve mechanism for installation in a pipe line for controlling the movement of a flowable material therein, the said mechanism comprising:

a) a central body section with end sections connected thereto and forming therewith a valve stopper chamber, said end sections each having an associated annular extension projecting into said valve stopper chamber with fluid-flow passages extending outwardly therefrom, b) a valve stopper in said chamber having a flow passage extending therethrough and sealing surfaces bounding the flow passage, c) means for moving said stopper to a valve open position substantially aligning the stopper flow passage with the extension flow passages, and to a valve closed position blocking said flow passages, d) and a gasket encircling each end section extension and thrust means operable to press said gaskets against the stopper sealing surfaces when the stopper is in valve open and valve closed positions, e) said thrust means including thrustors extending at least part way about said end sections, to be displaced for pressurizing said gaskets, and actuator means movable to displace said thrustors, f) blocking means for blocking access to said actuator means during said movement of the stopper between valve open and valve closed positions, said blocking means allowing access to said actuator means when the stopper is in said open and closed positions, g) said blocking means including a plate movable in conjunction with movement of said means for moving the stopper, h) and wherein said plate has two holes, one of which is in registration with said actuator means in valve open position of the stopper, and the other of which is in registration with said actuator means in valve closed position of the stopper.

9. The combination of claim 8 including stops on the plate to engage structure on the valve to limit plate movement when the plate holes are alternately in registration with the actuator means.

* * * * *